(12) United States Patent
Young

(10) Patent No.: US 6,515,973 B1
(45) Date of Patent: Feb. 4, 2003

(54) METHOD OF ESTABLISHING A SOFT CIRCUIT BETWEEN A SOURCE NODE AND A DESTINATION NODE IN A NETWORK OF NODES TO ALLOW DATA TO BE TRANSMITTED THEREBETWEEN

(75) Inventor: C. David Young, Plano, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/198,972

(22) Filed: Nov. 24, 1998

(51) Int. Cl.[7] .............................................. H04B 7/204
(52) U.S. Cl. ...................... 370/329; 370/341; 370/348; 370/443; 370/468
(58) Field of Search ................................. 370/282, 319, 370/329, 341, 345, 348, 436, 443, 461, 468, 405, 478

(56) References Cited

U.S. PATENT DOCUMENTS

| | | | | |
|---|---|---|---|---|
| 5,734,833 A | * | 3/1998 | Chiu et al. ............. | 395/200.55 |
| 5,742,593 A | * | 4/1998 | Sharony et al. ............ | 370/330 |
| 5,949,760 A | * | 9/1999 | Stevens et al. ............. | 370/254 |
| 5,987,018 A | * | 11/1999 | Freeburg et al. ............ | 370/345 |
| 6,236,662 B1 | * | 5/2001 | Reilly ........................ | 370/462 |
| 6,292,475 B1 | * | 9/2001 | Swail ........................ | 370/329 |

* cited by examiner

*Primary Examiner*—Hassan Kizou
*Assistant Examiner*—Anh-Vu H Ly
(74) *Attorney, Agent, or Firm*—Nathan O. Jensen; Kyle Eppele

(57) ABSTRACT

A method is disclosed for utilizing the communication channel resources between source and destination nodes in a network of transceiver nodes, wherein each node communicates during specific times slots and uses multiple frequencies on a time division multiple access basis. Each node utilizes a soft circuit protocol so that enough slots are assigned on each node's outgoing communication links to satisfy the requirements of the traffic passing through each node. In one embodiment, a soft circuit is established by sending a route trace packet which contains the capacity requirement for a particular traffic stream from the source node to the destination node. In a second embodiment, a soft circuit is established by using a push path wherein the traffic pushes its way through the network to establish the circuit along the way from the source node to a destination node.

15 Claims, 1 Drawing Sheet

METHOD OF ESTABLISHING A SOFT CIRCUIT BETWEEN A SOURCE NODE AND A DESTINATION NODE IN A NETWORK OF NODES TO ALLOW DATA TO BE TRANSMITTED THEREBETWEEN

FIELD OF THE INVENTION

The present invention generally relates to a method of utilizing communication channel resources between the nodes of a network and, more particularly, to a method of establishing a soft circuit between a source node and a destination node in a network of nodes to allow data to be transmitted therebetween.

BACKGROUND OF THE INVENTION

FIG. 1 is a diagram that illustrates an example of a network of nodes. Each node includes a simplex transceiver that is provided with an omnidirectional antenna. In this network, a transmission from one node is broadcast to all nodes in its "neighborhood." For example, at UHF frequencies, the neighborhood nodes are typically those nodes within line-of-sight or one hop of the transmitter node. In the example shown in FIG. 1, when node 1 transmits data, nodes 3–8 receive the data. In order for data to be transmitted over multiple hops, the data must be relayed by one or more of its neighbor nodes to a destination node. For example, nodes 8 and 4 must relay data through node 1 so that it may be transmitted to node c or node 9, respectively. In this way, the data is relayed until it has arrived at all intended destination nodes.

In the network shown in FIG. 1, each node cannot transmit and receive data at the same time. Similarly, a node cannot receive data from more than one other node at a particular point in time. For example, if two nodes which are both within transmission range of an intended receiver were to transmit at the same time, then the intended receiver would not be able to successfully receive any data packet from either source.

Since there generally are limitations on the number of simultaneous transmitters that a receiver can successfully process, typically one, data collisions can be avoided by assigning time slots in which individual nodes can transmit. There are many approaches to deciding which nodes are assigned which slots, and the approach is generally driven by the network application. Examples of these types of applications include, for example, broadcast, multicast, unicast, datagrams, and virtual circuits. Typically, a heuristic approach is taken to design an integrated protocol that both chooses the number of slots to assign to each neighboring node and coordinates their activation in the network because, for example, the problem of optimally assigning slots in this environment is mathematically intractable.

U.S. Pat. No. 5,719,868 discloses a single, generalized protocol for reliably choosing the slots and coordinating their activation with minimal overhead which can then be used to support many different higher layer heuristics for selecting the number of slots to be activated with which neighbors. In particular, the '868 patent discloses a method for automatically managing the communication channel resources between two nodes having neighboring nodes in a network of transceiver nodes as, for example, shown in FIG. 1. It should be noted that slight variations of the data structures and rules disclosed in the '868 patent which are set forth in greater detail hereafter allow full duplex radios and/or radios with multiple transmitters and receivers to be adequately handled.

Referring back to FIG. 1, each node communicates during specific time slots and uses multiple frequencies on a time division multiple access basis. The communication resources of this network can be managed by a method which includes the steps of storing a table of possible communication frequencies and time slots between the nodes in the network. This method also includes the steps of announcing and transmitting during a specific time slot on a selected transmit frequency and slot from a first node to a second node and all neighboring nodes of the first node. The announced frequency and slot have certain constraints on reuse within two hops of the transmitting node to thereby establish contention free communication on the frequency and slot between the first and second nodes.

Various types of data can be transmitted over the network shown in FIG. 1 such as, for example, video and voice data. In order to guarantee a sufficient throughput and latency which is necessary to support the transmission of video and voice traffic, slots on each link along the route from the source node to the destination node must be preallocated. One way to accomplish this is to use a so-called virtual circuit, which requires a call setup, allocation of dedicated slots along the route, and a teardown phase to release the slots when the circuit is no longer needed. In a virtual circuit, the route from source to destination is predetermined, but there is still potentially contention for the channel resources from other traffic using the same links. This leads, for example, to queuing delays that can impact both throughput and delay which degrades the quality of resultant output signals.

Video and voice signals have a number of characteristics in common. First, video and voice signals both are tolerant of small amounts of dropped data and data that arrives at a destination out of order. This is in direct contrast to, for example, a file transfer application where such occurrences would be unacceptable. The CVSD data stream for voice signals and the ATM data stream for video signals both contain embedded synching information. Thus, a short perturbation in either data stream would result in a small glitch which, if infrequent enough, should not be of much consequence to a user. A second characteristic of video and voice applications is that once the stream of traffic starts, they continuously supply data at the same rate until the user terminates the call, even when, for example, the user is not speaking.

A virtual circuit may be used to transmit video and voice data from a source node to a destination node. However, such an approach is wasteful of communication channel resources in that a call setup, allocation of slots along the route, and a teardown phase is required as discussed above. A need has thus arisen for an improved heuristic that takes advantage of certain characteristics of the video and voice data streams such as, for example, the synching information embedded therein to allow the network's communication channel resources to be more effectively and efficiently used.

SUMMARY OF THE INVENTION

In accordance with one aspect of the present invention, a method is provided for utilizing the communication channel resources between source and destination nodes in a network of transceiver nodes, wherein each node communicates during specific time; slots and uses multiple frequencies on a time division multiple access basis. The method includes the step of each node utilizing a soft circuit protocol so that enough slots are assigned on each node's outgoing communication links to satisfy the requirements of the traffic passing through the node.

In a first embodiment of the invention, a soft circuit is established by sending a route trace packet, which contains the capacity requirement for a particular traffic stream, from the source node to the destination node. According to a second embodiment of the invention, a soft circuit is established by using a push path wherein the traffic pushes its way through the network to establish the soft circuit along the way from a source node to a destination node.

Utilizing a soft circuit protocol for the transmission of data streams such as, for example, video and voice traffic has a number of advantages. For example, the communication channel resources of a network are more effectively and efficiently used for the transmission of these data streams by utilizing the capabilities of a uniform slot assignment protocol and by taking advantage of certain characteristics of the data streams such as, for example, the ability to quickly resynchronize after a data glitch and the continuous nature of the data stream.

Other features and advantages of the invention will become apparent from the description that follows.

DETAILED DESCRIPTION OF THE INVENTION

Figure 1:
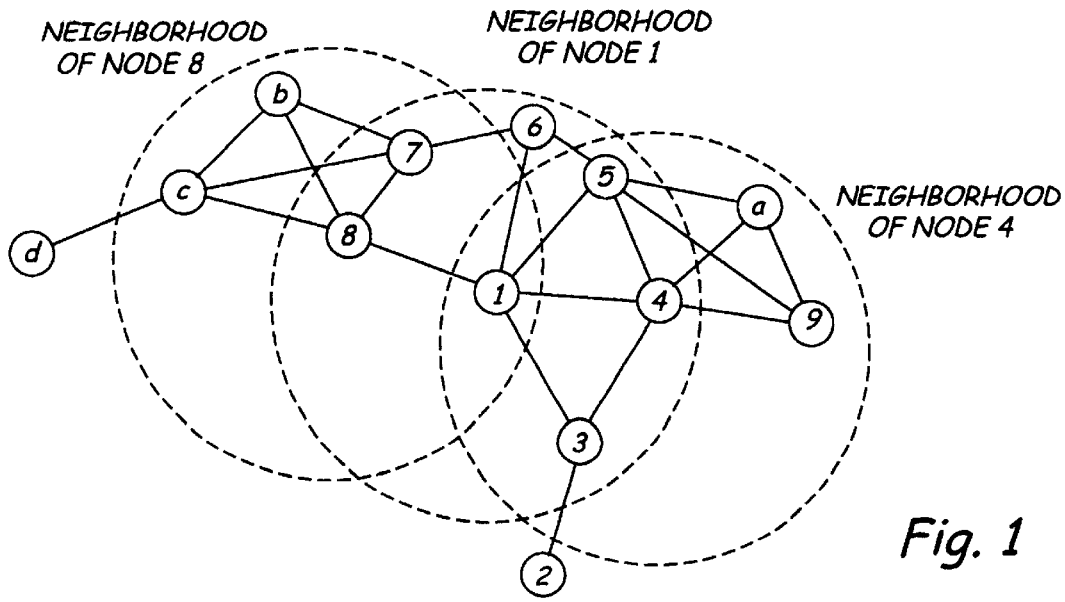
FIG. 1 is a diagram of an example of a network of nodes.
Figure 2:
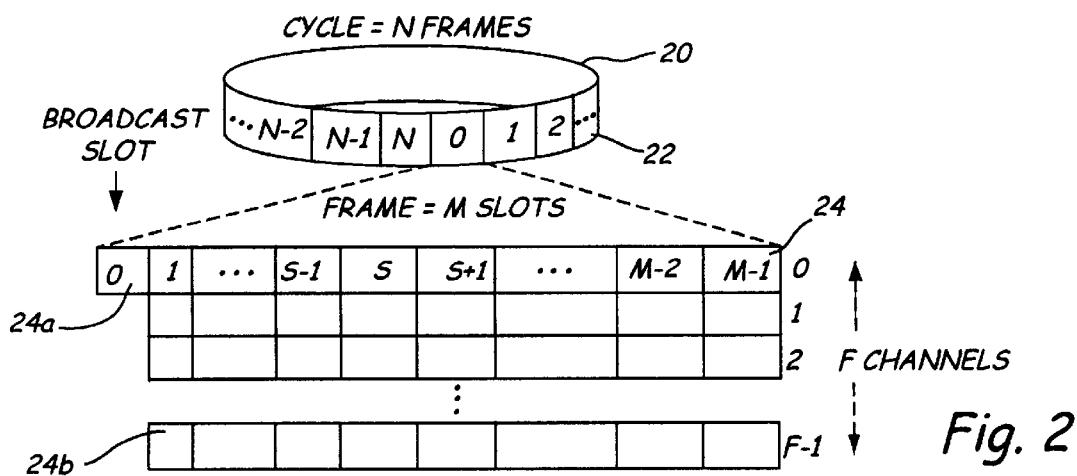
FIG. 2 is a diagram of an example of a time division multiple access structure utilized with a dynamic distributed, multi-channel time division multiple access slot assignment method for a network of nodes.

Referring to FIG. 2, an example of a time division multiple access structure for use with an embodiment of the present invention is illustrated. A cycle 20 includes N frames 22. Each frame 22 consists of M slots 24. The first slot 24a is a broadcast slot for network manager control packets. A broadcast slot 24 is assigned to each node in the network, so if there are N nodes, each node has an opportunity to transmit its control packet once every N frames which represents a cycle 20. Additionally, associated with each frame 22 are multiple frequency channels 26.

To reliably share critical network management information with its neighbors, a node will transmit in its assigned broadcast slot 24a. In this slot, all current and potential neighbors of the transmitting node have an opportunity to receive control packets from this node. Control packets contain information required to implement network entry, time slot management, and any other protocol benefiting from the broadcast nature of the control packet, such as, for example, a routing protocol. The control packets are transmitted at the most robust data rate that can be utilized by user traffic and their size should be minimized since they represent network overhead.

The tasks the present method performs can be broken into two categories:

| | |
|---|---|
| individual | announcing and confirming the assignment of individual slots; and |
| composite | using composite bit maps to report assignments, bring new neighbors up-to-date and to detect and correct conflicting assignments. |

The information shared between neighbors is somewhat different for the individual and composite tasks. The individual information is incremental in that it consists only of the slots being assigned. The composite information consists of entire bit maps shared in every control packet. Here the data structures are presented that are stored at and/or shared between neighbors:

Slot Assignments $$S = \text{set of slots} = \{s | s = 1, 2, \ldots, M\} \quad (1)$$

$$F = \text{set of channels} = \{f | f = 1, 2, \ldots, F\} \quad (2)$$

For a given channel and slot pair (s,f):
Self Tx/Rx Sets:

$$STNi(s,f) = \text{neighbors to which a node is transmitting on } (s,f) \quad (3)$$

$$SRNi(s,f) = \text{neighbors from which a node is receiving on } (s,f) \quad (4)$$

from which the following are derived:

$$STi(s,f) = 1 \text{ if } STNi(s,f) \text{ not empty, else } 0 \quad (5)$$

$$SRi(s,f) = 1 \text{ if } SRNi(s,f) \text{ not empty, else } 0 \quad (6)$$

Neighbor Tx/Rx Sets:

$$STj(s,f) = \text{the } STi(s,f) \text{ reported by a neighbor} \quad (7)$$

$$SRj(s,f) = \text{the } SRi(s,f) \text{ reported by a neighbor} \quad (8)$$

from which the following are derived:

$$NTi(s,f) = UST(s,f) \text{ over all neighbors of a node} \quad (9)$$

$$NRi(s,f) = USRj(s,f) \text{ over all neighbors of a node} \quad (10)$$

$$NTj(s,f) = \text{the } NTi(s,f) \text{ reported by a neighbor} \quad (11)$$

Defined but not used:

$$NRj(s,f) = \text{the } NRi(s,f) \text{ reported by a neighbor} \quad (12)$$

If a node or its neighbor is transmitting or receiving (on any channel) in slots s, it is blocked from doing anything else. To this end, the following derived tables are useful:

$$Bi(s) = STi(s,f) USRi(s,f) \text{ for any } f \quad (13)$$

$$Bj(s) = STj(s,f) USRj(s,f) \text{ for any } f \quad (14)$$

A feature of the present method is that every node is responsible only for assigning (s,f) pairs on which it will transmit and not on (s,f) pairs which it will receive. By assigning only transmit (s,f) pairs, a node must share less information with its neighbors. Thus, to decide what slots and channels are available for assignment, a node i constructs the blocked (s,f) pairs for transmitting to node j by excluding (s,f) pairs:

that have already been assigned to either node: Bi(s)UBj(s)
and it's neighbors are receiving in: NRi(s,f)
and j's neighbors are transmitting in: NTj(s,f)
This information is combined as follows:

$$Blocked(i, j, s, f) = Bi(s) UBJ(s) UNRi(s, f) UNTj(s, f) \quad (15)$$

$$= 1 \text{ if } 1 \text{ cannot transmit to } j \text{ in } (s, f) \quad (16)$$
$$\text{else } 0$$

Figure 3:
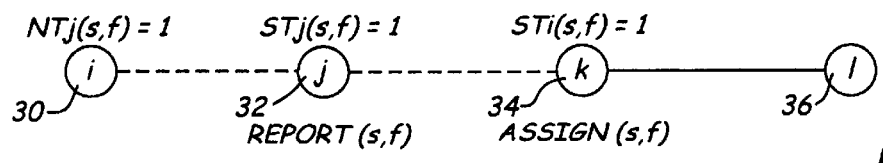
FIG. 3 is an illustration of nodes in a network.

FIG. 3 illustrates an example including nodes i, j, k, and l (30, 32, 34, and 36, respectively) wherein node 34 assigns itself (s,f) to transmit to node 36. This slot and frequency is announced in node 34's control packet. Node 32 hears this and stores it as its STj(s,f) table for neighbor 34 and reports it in its control packet as part of its NTi(s,f). When node 30 hears this, it stores it as its Ntj(s,f) for neighbor 32. Thus, if node 30 wishes to assigned itself a transmit slot to neighbors 32, (s,f) would be unavailable to it by the definition of Blocked (ij,s,f) (Equation 15). However, another neighbor of 30, that is not a neighbor of the neighbor 34, would be free to reassign (s,f) because it would be more than two hops away from node 34.

Nodes use the control packet to keep the data structures up-to-date that are combined to create Blocked (ij,s,f). In this way, a node needing a slot assignment can make it immediately. Thus, instead of a three-way handshake, a node merely announces the new slot assignment(s) in a control packet, and all of its neighbors update their tables.

One way for a node to detect conflicts is for it to compare its SRNi(s,f) with the STj(s,f) received from its neighbors. From these structures a node can determine if it is scheduled to receive from one neighbor while another is transmitting, which is not allowed. In this case, this node must convey to its transmitting node that the slot has been dropped and must be reassigned. Other methods of conflict detection and resolution will be subsequently described.

To carry out the individual and composite tasks, a node transmits the following information at the indicated rate:

| Task | Information Shared | Rate |
|---|---|---|
| individual | (s, f) | on announcement or confirmation |
| composite | STi(s, f), SRi(s, f), NTi(s, f) | every control packet |

When a node transmits a control packet, the node includes a section for each neighbor, in which it will put the (s,f) being announced or confirmed. This node announces or confirms with respect to the neighbor in whose control packet section the (s,f) pair appears. With respect to the individual task, when a neighbor of the transmitter transmits a control packet containing an announcement, it will update its STj(s,f), NTi(s,f), and, if it is the receiver, its SRi(s,f), the last two of which will be included in the next control packet along with the STi(s,f). With respect to the composite task, upon reception of a control packet, nodes can store the STi(s,f) as an STj(s,f), the SRi(s,f) as an SRj(s,f) and the NTi(s,f) as an NTj(s,f). Nodes can also pass status information in the control packet so that a node can determine when a neighbor has heard its last control packet. When a neighbor of the transmitter has determined that all of its neighbors have heard at least one control packet from its since it heard an announcement for an (s,f) pair, it can confirm the pair in its next control packet with respect to the transmitter.

When the transmitter receives this control packet, it will consider the (s,f) pair confirmed. The transmitter will continue announcing the (s,f) pair in subsequent control packets until it gets a confirmation from all of its neighbors. In this way, the knowledge of the transmitter's assignment of (s,f) propagates two hops.

When the transmitter no longer needs (s,f), it can release the slot by deleting the receiver from its STNi(s,f) and deleting (s,f) from its STi(s,f). When the neighbors of the transmitter receive its next control packet they can update their STj(s,f) and NTi(s,f), the latter of which will be included in their next control packet so that the knowledge of the transmitter's release of (s,f) will propagate two hops. In addition, when the receiver hears the transmitter's control packet with the updated STi(s,f), it can delete the transmitter from its SRNi(s,f) and (s,f) from its SRi(s,f). In this way, (s,f) will once again be available for assignment under the constraints of Equation 15 within the two hop radius of the transmitter. This last mechanism at the receiver also allows it to detect when it has a conflicting time division multiple access schedule. While comparing the STj(s,f) of neighbor j with its SRNi(s,f) to see if a transmitter has dropped (s,f), it can also check to see if it is assigned to receive from a neighbor other than j in a slot in which j is transmitting, which would be illegal. In either case, it will delete the transmitter from its SRNi(s,f) and (s,f) from its SRi(s,f). In the case of a conflict, after the receiver's next control packet the transmitter can recognize that it has dropped (s,f) and take the appropriate action.

The data structure previously described are designed to prevent conflicts at a receiver due to two transmitters within its neighborhood using the same frequency. In some networks it may be desirable to reduce the noise flow at the receivers by adding an additional hop of isolation before a frequency is reassigned. This can be accomplished by defining the set of nodes that are transmitting within three hops of a node of an (s,f) pair as:

$$NNTi(s,f) = UNTj(s,f) \text{ over all neighbors of a node} \quad (17)$$

If this is also included in the control packet, then it can be stored at the neighbors of a node as NNTj(s,f) and then they can generate Blocked (ij,s,f) as follows, which will prevent conflicting transmissions within three hops of a transmitter:

$$Blocked(i, j, s, f) = Bi(s) U Bj(s) U NRi(s, f) U NTj(s, j) U NNTj(s, f) \quad (18)$$

$$= 1 \text{ if node } i \text{ cannot transmit to neighbor } j \quad (19)$$
$$\text{in } (s, f), \text{ else } 0$$

Conflicting assignments among neighbors as a result of unfortunate timing or missed packets can be defined as transmit conflicts and receive conflicts.

A transmit conflict can be detected by the transmitter of an assignment. Since all information about assignments are spread via the control packets, the transmitter must examine the various records contained in a control packet to detect conflicts. Thus, there are basically three types of records that the transmitter can examine: the announcement records, the confirmation records, and the SRi(s,f) records. The other composite records, STi(s,f) and NTi(s,f), are necessary to make assignments but do not contain any additional information that the transmitter can use to detect conflicts. Each of these records detect and resolve conflicts as follows:

(1) The announcement records:

Node i is announcing or has finished announcing (s,f) and it receives a control packet from a (new) neighbor also announcing and one of the following conditions is true:
 (a) The pair that the neighbor is announcing has the same slots and one of the following is true:
  i) it is with respect to node i, then the resolution is to reject the transmitter's announcement;
  ii) it with respect to node i's receiver, then the resolution is to ignore, and let the receiver reject the transmitter's announcement;
  iii) the neighbor is node i's receiver, then the the resolution is to accept and drop self as the transmitter;
 (b) The pair that the neighbor is announcing has the same slot s and frequency f and is with respect t a neighbor of node i, then the resolution is to ignore, and let the receiver reject one of two transmitters.

Condition (a) arises because node i and its receiver are blocked on all frequencies in slot s and it is illegal for another node to transmit to either of these nodes in that slot or for the receiver to transmit at all in that slot. Condition (b) arises because all of node i's neighbors are blocked on (s,f) and it is illegal for any other node to transmit to them on (s,f).

(2) The confirmation records:
Node i is announcing or has finished announcing (s,f) and it received a control packet and it is from a (new) neighbor confirming (s,f) with respect to another node, then the resolution is to drop self as a transmitter.

(3) The SRi(s,f) record which is stored at a node as the SRi(s,f) for each neighbor:
Node i is announcing or has finished announcing (s,f), the neighbor's control packet indicates it heard node 9's last control packet in which (s,f) was identified as assigned by node i, and one of the following conditions is true:
  (a) the SRj(s,f) of the receiver indicates that it is not receiving in (s,f), then the resolution is to drop self as transmitter.
  (b) The SRj(s,f) of a neighbor other than receiver indicates that it is receiving in (s,f), then the resolution is to ignore, and let the neighbor reject the other transmitter.

Condition (a) is an indirect indication of a conflict because the receiver has detected a receive conflict with another node and abandoned the slots. Condition (b) can occur when the transmitter exchanges control packets with a new neighbor for the first time. A receive conflict can be detected by the neighbors of a transmitter and whose presence can then be conveyed back to the transmitter so that it can take corrective action. As in the case of a transmit conflict there are basically three types of records from the control packet that the neighbor can examine: the announcement records, the confirmation records, and the STi(s,f) records. The other composite records, SRi(s,f) and NTi(s,f) contain no additional information that the neighbor can use to detect conflicts. Each of these records detect and resolve conflicts as follows:

(1) The announcement records:
Node i receives a control packet from a neighbor announcing (s,f) and one of the following conditions is true:
  (a) Node i is the receiver in the announcement but node i's SRNi(s,f) indicates that it is the receiver for a different transmitter on slots, the resolution is to reject the transmitter's announcement.
  (b) Node i is not the receiver in the announcement but node i's SRNi(s,f) indicates that it is the receiver for a different transmitter on (s,f), the resolution is to reject the transmitter's announcement.

Condition (a) arises because a receiver is blocked on all frequencies in slots and it is illegal for another node to transmit to it in that slot. Likewise, condition (b) arises because all of the transmitter's neighbors are blocked on (s,f) and it is illegal for any other node to transmit to them on (s,f).

(2) The confirmation records:
Node i receives a control packet from a neighbor confirming (s,f) (where node i is not the transmitter) and the transmitter is a neighbor of node i and node i's SRNi(s,f) indicates that it is a receiver on (s,f). There cannot be two transmitters in the neighborhood of a single receiver or one transmitter transmitting to two receivers, the resolution is to drop neighbor from SRNi(s,f) for (s,f).

(3) The STi(s,f) record, which is stored at a node as the STj(s,f) for each neighbor:
Node i compares its SRNi(s,f) with the STj(s,f) of each neighbor and finds that one neighbor is transmitting on (s,f) while it is scheduled to receive from another on (s,f), the resolution is t drop neighbor from SRNi(s,f) for (s,f).

Therefore, it can be seen that one aspect of the present invention provides for a protocol for a time division multiple access architecture of a mobile multi-hop broadcast radio network that is capable of supporting different types of higher layer protocols for slot assignment process. The above-referenced protocol provides for a slot assignment protocol that is reliable, fast, flexible and functional.

A soft circuit is one heuristic that can run on top of the uniform slot assignment protocol (hereinafter "USAP") that is described above. This heuristic is individually run at each node in the network and, at each node, assigns enough slots on the node's outgoing communication links to satisfy the requirements of the traffic passing therethrough. If enough slots are available at a particular time, they are allocated to support the traffic stream.

According to one embodiment of the present invention, a soft circuit may be implemented by sending out a trace packet from a source node to a destination node. The trace packet contains information regarding the capacity requirement for the particular traffic stream associated therewith. After the trace packet reaches the destination node, there. is a short time-out during which the slots are maintained before the traffic starts. If the expected traffic never arrives, then the slots designated for the expected traffic stream are released for other uses. If a node along the designated route cannot satisfy the capacity requirement of a particular traffic stream, a negative acknowledgement is sent from the node at issue back to the source node. In such a case, a new route is chosen and the method of implementing a soft circuit between the source and destination nodes described above is run again.

According to a second embodiment of the present invention, a soft circuit is established between a source node and a destination node by using a push path wherein the traffic pushes its way through the network to establish the circuit along the way. One method for establishing a soft circuit in this manner is described in detail hereafter.

As traffic enters a node either from the IOP at the source node or over an incoming link at an intermediate node, the heuristic running at the node in question looks up the destination node in its routing table. The routing table is indexed by each node and indicates one or more neighboring nodes to route the packets that are intended for the destination node. These neighbors are called "next" nodes along the route toward the destination. If the destination node is a direct neighbor of the current node, then it is likely that the destination node is the preferred next node. However, this many not necessarily be the case if the link is poor or there is not sufficient capacity to handle the traffic. Also, at any point along the route the preferred next node may not have sufficient capacity for the offered traffic and an alternate next node may be chosen instead for some of the packets intended for the destination node.

If the network is static, the routing table can be loaded during initialization. For dynamic networks, the routing table is maintained by a routing protocol. For distributed networks, these protocols are generally categorized as either "link-state" or "distance-vector", which are well known as readily apparent to one of ordinary skill in the art. Basically, the link-state technique requires that each node in the network have full knowledge of every other node while the distance-vector technique uses only local knowledge. It can be assumed, for purposes of the present invention, that the information required to run the routing protocol is exchanged in the net management packets transmitted in the broadcast slots.

If the link on the next hop in the route has enough allocated capacity to handle the incoming traffic, then the traffic is routed over the link to the next node along the designated route. If there currently is not enough capacity allocated on the link of the primary route but there is enough unused capacity to satisfy the increased traffic requirements, then the soft circuit heuristic running at that particular node calls USAP to assign more slots on the link between that node and the next node along the designated route.

If the link on the primary route cannot carry all of the increased traffic, then the soft circuit heuristic determines whether the traffic can be transmitted to the destination node along an alternative path. While USAP is going through the assignment process described above with reference to FIGS. 2 and 3, the soft circuit heuristic processes the traffic and drops the data until a link is found with sufficient capacity to allow the data to be transferred.

If no outgoing link with sufficient capacity is found to handle the increased traffic, USAP is called to release the slots on the incoming link that are dedicated to that traffic. Alternatively, the source node IOP is told that it currently is not possible to establish the desired soft circuit.

If an uphill node along a designated route sees its slots being released on an outgoing link, the uphill node will either try to reassign the slots on another outgoing link or, if this is not possible, release the corresponding slots on its incoming link. In this way, the push path will either form all the way from the source node to the destination node or a failure will be reported back to the source node IOP.

If at any point in the process described above a node does not have enough unused capacity on its outgoing links and the new incoming traffic has higher priority than that of some of the older existing traffic, the new traffic can push aside the lower priority traffic by releasing or reassigning slots on the outgoing links. This causes the slots of the lower priority traffic on the incoming links to be released. Once slots are allocated to a particular traffic stream, the slots are released after a short time-out if that traffic stream stops.

Establishing a soft circuit in the manner described above has a number of advantages. For example, any breakage in the communication links between the source and destination nodes is fixed locally at a particular node along the designated route instead of reporting a failure back to the source node in all cases. Even though short glitches in the data stream are developed during the time it takes to fix the breakage, such glitches are less noticable than would be the case if a dedicated circuit were used because, for example, each breakdown in a dedicated circuit requires a circuit teardown phase and setup.

To minimize the chances that soft circuit packets arrive at a destination node out of order, the soft circuit heuristic run at each node can keep track of which slots are assigned to which traffic stream. This is accomplished by, for example, the source node IOP assigning a circuit number to each particular traffic stream so that all of the packets for a specific stream go over the same outgoing link. This also tells the source node which slots are assigned to which streams on the incoming links so that the incoming links can be released, if necessary.

From the point of view of the user, there is a short delay as the IOP turns on the input data stream to establish the push path. If, after an appropriate timeout the network management does not report back to the source node that the push path has failed, the IOP can notify the user that the soft circuit has been successfully established.

While the invention has been illustrated and described in detail in the drawings and foregoing description, the same is considered as illustrative and not restrictive in character, it being understood that all changes and modification that come within the spirit of the invention are desired to be protected.

What is claimed is:

1. A method of establishing a soft circuit between a source node and a destination node in a network of nodes using a soft circuit heuristic, each node having a set of neighboring nodes and communicating to its set of neighboring nodes during specific time slots and using multiple frequencies on a time division multiplex basis, the method comprising the steps of:

assigning slots at each node on an outgoing communications link to satisfy data traffic requirements;

establishing a push path between the source node and the destination it node wherein the data traffic pushes its way through the network to establish the soft circuit;

transmitting the data on the soft circuit from the source node to an intermediate node;

receiving data at an intermediate node from the source node over the push path;

looking up the destination node in a routing table at the intermediate node using the soft circuit heuristic;

transmitting the data to a preferred next node when the preferred next node is the destination node;

transmitting the data to the preferred next node toward the destination node when the communications link has sufficient capacity for the data traffic;

choosing an alternate next node if the preferred next node does not have sufficient capacity for the data traffic;

assigning additional slots at the preferred node to satisfy the data traffic requirement if the preferred next node does not have sufficient capacity; and transmitting the data on the soft circuit to the destination node on an alternate communication link via the alternate next node.

2. The method of claim 1 further comprising the steps of:

transmitting a trace packet containing information regarding data capacity requirements from the source node to the destination node on the outgoing communication link;

receiving the trace packet at the destination node; and maintaining the slot assignments for a short timeout.

3. The method of claim 2 further comprising the step of releasing any slots designated for the data on the soft circuit outgoing communication link if no data traffic is received at the destination node.

4. The method of claim 2 further comprising the steps of:

sending a negative acknowledgement from an intermediate node to the source node if the intermediate cannot satisfy the capacity requirement; and choosing the alternate communications link.

5. The method of claim 1 further comprising the steps of:

dropping the data until a link is found with sufficient capacity to allow the data to be transferred;

releasing slots on the incoming link that are dedicated to the data traffic if no outgoing link with sufficient capacity is found; and informing the source node that it is not possible to establish the desired soft circuit.

6. The method of claim 1 further comprising the steps of:

seeing slots being released on an outgoing link by an uphill node;

reassigning slots being released on another outgoing link by the uphill node along a designated route when possible; and releasing slots on an incoming link when it is not possible to reassign the slots.

7. The method of claim 1 further comprising the steps of:

pushing aside lower priority traffic at a node that does not have enough unused capacity on its outgoing links when new traffic has higher priority;

releasing slots on the outgoing links to push aside lower priority traffic; and reassigning slots on the outgoing links to push aside lower priority traffic.

8. A method of communicating voice and video data traffic in a communications network operating with a uniform slot assignment protocol comprising the step of running a soft circuit heuristic on top of the uniform slot assignment protocol at each node in the communication network wherein said step of running the soft circuit heuristic further comprise:

assigning enough slots at each node on each node's outgoing communication link to satisfy the requirements of expected voice and video traffic passing through;

allocating the assigned slots to support the traffic if enough slots are available;

establishing a soft circuit with a push path wherein the voice and video data traffic pushes its way through the communications network;

receiving traffic at an intermediate node from a source node over the push path;

looking up the destination node in a routing table at the intermediate node using the soft circuit heuristic;

transmitting the traffic to a preferred next node when the preferred next node is the destination node;

transmitting the data traffic to the preferred next node toward the destination node when the communications network has sufficient capacity for the traffic;

choosing an alternate next node if the preferred next node does not have sufficient capacity for the traffic;

assigning additional slots at the preferred next node to satisfy the data traffic requirement if the preferred next node does not have sufficient capacity; and transmitting the data to the destination node through the alternate next node.

9. The method of claim 8 further comprising the steps of:

sending a trace packet containing information regarding capacity requirements for a particular traffic stream from a source node to a destination node;

receiving the trace packet at the destination node;

maintaining the slot assignments for a short time out;

releasing the allocated slots if the expected voice and video traffic does not arrive;

sending a negative acknowledgement from an intermediate node back to the source node if the intermediate node cannot satisfy the capacity requirement of the trace packet; and choosing a new route to implement the soft circuit between the source node and destination node.

10. The method of claim 8 further comprising the steps of;

dropping the data until a link is found with sufficient capacity to allow the data to be transferred, releasing slots on the incoming link that are dedicated to the data traffic if no outgoing link with sufficient capacity is found; and informing the source node that it is not possible to establish the desired soft circuit.

11. The method of claim 8 further comprising the steps of:

seeing slots being released on an outgoing link by an uphill node;

reassigning slots being released on another outgoing link by the uphill node along a designated route when possible; and releasing slots on an incoming link when it is not possible to reassign the slots.

12. The method of claim 8 further comprising the steps of:

pushing aside lower priority traffic at a node that does not have enough unused capacity on its outgoing links when new traffic has higher priority;

releasing slots on the outgoing links to push aside lower priority traffic; and reassigning slots on the outgoing links to push aside lower priority traffic.

13. A method of communicating traffic in a communications network comprising the steps of:

running a soft circuit heuristic at each node in the communications network by assigning enough slots at each node on the each node's outgoing communications link to satisfy requirements of expected traffic passing through and allocating the assigned slots to support the traffic if enough slots are available;

establishing a soft circuit between a source node and a destination node by using a push path wherein the traffic pushes its way through the network to establish the soft circuit along the way;

receiving traffic at an intermediate node from a source node over the push path;

looking up the destination node in a routing table at the intermediate node using the soft circuit heuristic;

routing the traffic to a preferred next node toward the destination node;

choosing an alternate next node if the preferred next node does not have sufficient capacity for the traffic;

assigning additional slots at the preferred next node to satisfy the traffic requirement if the preferred next node does not have sufficient capacity; and transmitting the data traffic to the destination node through the alternate next node.

14. The method of claim 13 further comprising the steps of:

dropping the data until a link is found with sufficient capacity to allow the data to be transferred;

releasing slots on the incoming link that are dedicated to the data traffic if no outgoing link with sufficient capacity is found; and informing the source that it is not possible to establish the desired soft circuit.

15. The method of claim 13 further comprising the steps of:

pushing aside lower priority traffic at a node that does not have enough unused capacity on its outgoing links when new traffic has higher priority;

releasing slots on the outgoing links to push aside lower priority traffic; and reassigning slots on the outgoing links to push aside lower priority traffic.

* * * * *